United States Patent Office 3,452,744
Patented July 1, 1969

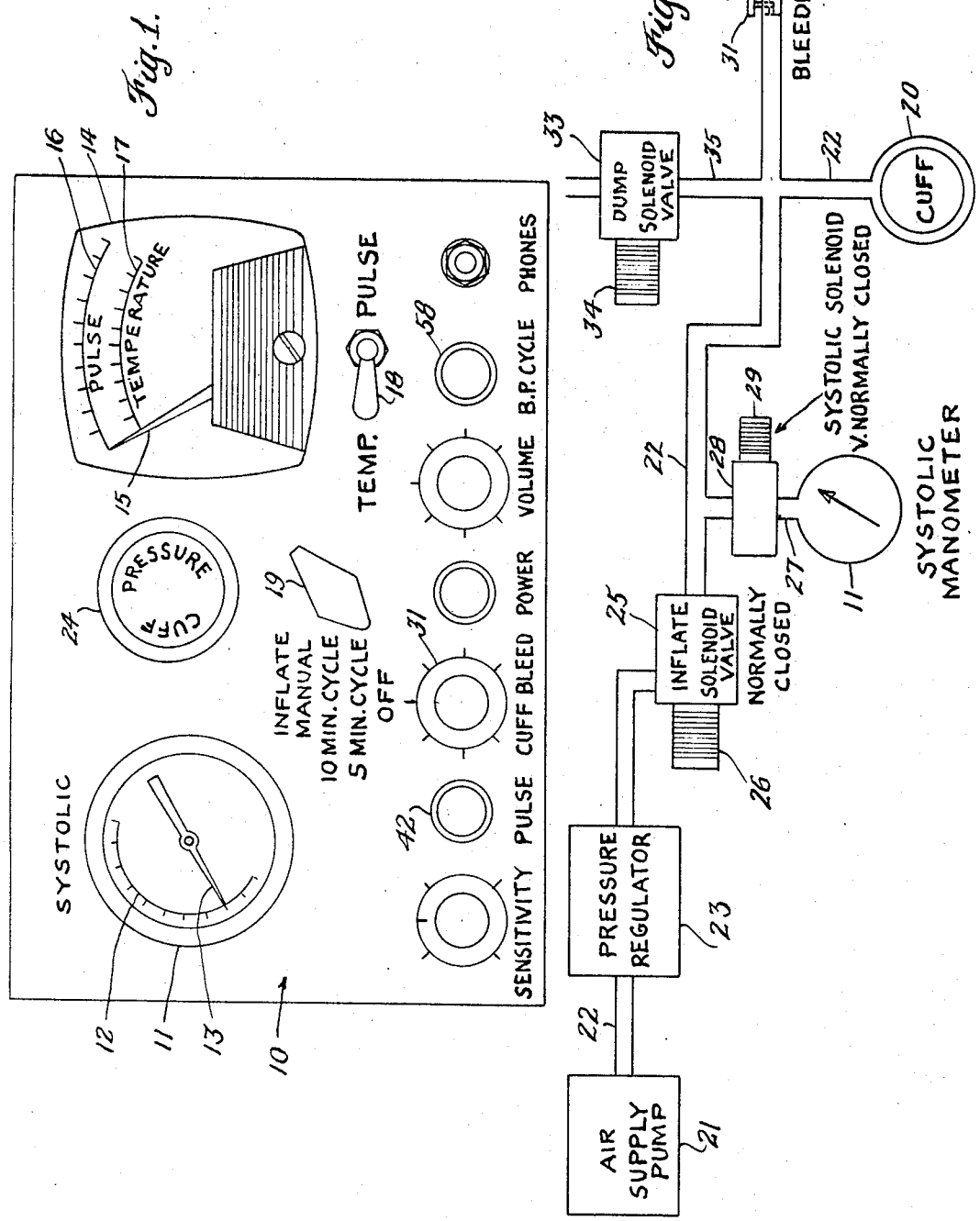

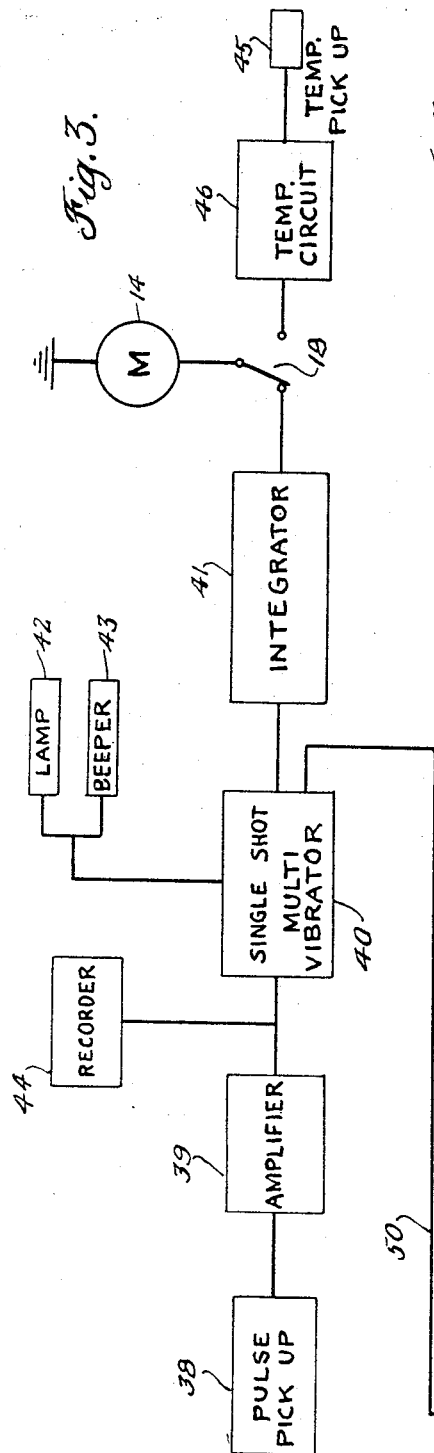
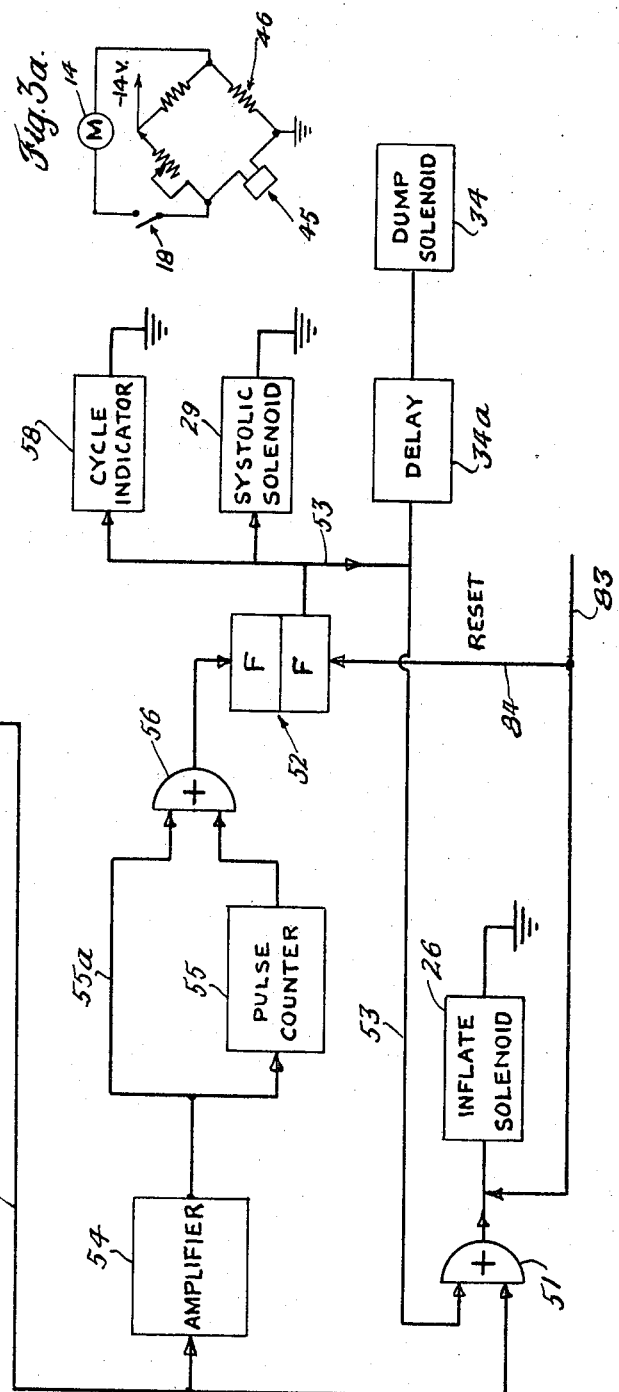

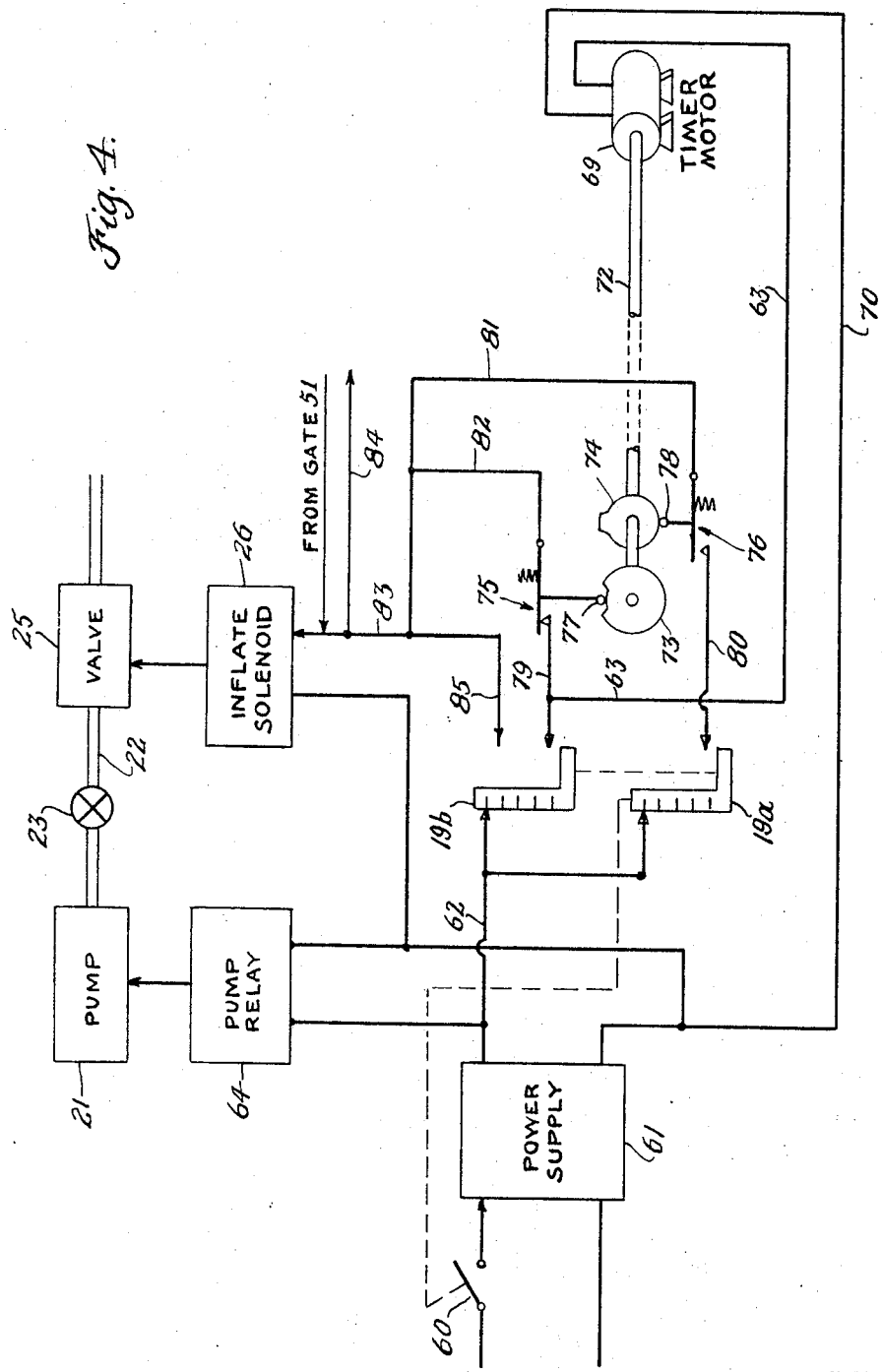

3,452,744
BLOOD PRESSURE MONITORING APPARATUS
Ronald A. Van Den Nieuwenhof, Warminster, and Edward P. Romani, Levittown, Pa., assignors to Air-Shields, Inc., Hatboro, Pa., a corporation of Delaware
Filed Nov. 3, 1964, Ser. No. 408,551
Int. Cl. A61b 5/02
U.S. Cl. 128—2.05          8 Claims This invention relates to medical diagnostic equipment and more particularly to apparatus for monitoring certain characteristic or vital signs of the human body.

The instrument of the invention is adapted to measure a patient's blood pressure, pulse and temperature. A special feature of the invention is the provision of a novel arrangement for obtaining accurate blood pressure readings. It is especially useful in hospital operating and recovery rooms where it is extremely important that doctors and other attendants be aware of changes in the patient's condition. In the preferred embodiment, the invention is capable of taking, automatically, blood pressure measurements at timed intervals. In between these measurements, the pulse, or optionally, the temperature of the patient is displayed on a dial on the face of the instrument.

The conventional method of measuring blood pressure involves the use of an inflatable cuff which is wrapped around the limb of a patient and is inflated to a pressure at which the flow of blood through an artery in the limb is restricted. The cuff is used in conjunction with a stethoscope and other inflation, the cuff pressure is slowly reduced until a value is reached at which the heart is able to pump blood in small spurts through the artery. This pulse is detectable by the stethoscope which is applied to the limb beyond the location of the cuff. The pressure at which pulses or spurts first occur is called the systolic pressure and represents the peak pressure developed by the heart during each heart beat.

While the invention is not limited to this method of operation, the preferred form is embodied in automatic equipment which duplicates the above described manually performed steps of operation. The equipment includes generally an inflatable cuff or other pressure operated device capable of restricting the flow of blood through an artery, a pressure supply means capable of delivering pressure to the pressure operated device above the systolic value so that the blood flow through the artery is prevented, means for bleeding off the pressure in the cuff to a level below the systolic value, a transducer responsive to the presence of a pulse in the artery downstream of the cuff, control circuitry and an indicator capable of giving a reading of the cuff pressure at the point at which the systolic pulse is picked up by the transducer. The equipment also includes a second indicator capable of indicating the pulse rate between blood pressure measuring cycles. Switching means are provided to connect the second indicator to a temperature responsive probe in order to also provide a reading of the patient's temperature when desired by the attendant.

Prior approaches in the field of automatic blood pressure measuring by electronic means have involved certain difficulties due to the fact that extraneous signals not representative of the systolic pulse in the patient's artery, may trigger the electronic circuitry giving a faulty reading of the patient's blood pressure. Inexperienced attendants may take these faulty readings at their face value with the result that the true condition of a patient is not accurately detected.

In view of the foregoing, an important object of the present invention is the provision of monitoring equipment which automatically and in rapid succession checks and rechecks the systolic pressure reading during each pressure measurement cycle. Thus the attendant can readily observe the occurrence of a reading which is out of line with other readings taken during the same cycle. At the end of the measurement cycle, the final pressure reading is locked on the indicating gauge, until the next measurement cycle is initiated.

Another important object of the invention is the provision of monitoring equipment which is capable of use to monitor several different vital signs of a given patient.

A still further object of the invention is the provision of monitoring equipment which may be operated by relatively unskilled attendants and which does not require constant observation and manipulation in order to deliver the monitored data.

A still further object of the invention is the provision of monitoring equipment which has the requisite reliability, simplicity and accuracy necessary in equipment used in connection with the treatment of human subjects.

How the foregoing and other objects of the invention are achieved will become more fully apparent from the following description and from the accompanying drawings in which:

FIGURE 1 is a front view of the instrument panel of the preferred embodiment of the invention;

FIGURE 2 is a diagrammatic view of the mechanical system of the apparatus of the preferred embodiment;

FIGURE 3 is a schematic illustrating the preferred electronic control circuitry used in carrying out the invention;

FIGURE 3a shows a preferred form of temperature measuring circuit; and

FIGURE 4 is a schematic view of the cycle initiating circuit of the preferred embodiment of the invention.

The instrument illustrated is provided with an instrument panel 10 shown in FIGURE 1 on which is mounted a pressure gauge 11 for indicating the systolic blood pressure of the patient. The gauge is of conventional form and includes a scale 12 graduated in millimeters of mercury and an indicator needle 13. The instrument is also provided with a second gauge 14 and includes a needle 15 which cooperates with scales 16 and 17 graduated in units of pulses per minute and temperature respectively. A two-position switch 18 selectively connects the meter 14 to apparatus for monitoring the pulse or temperature of the patient as will be described in greater detail hereinafter. The instrument is provided with a main operating switch 19 which is movable to cause a pressure reading to be taken at convenient intercals such as once every five or ten minutes or at the will of the attendant.

Referring to FIGURE 2, the instrument includes a pressure operated device which, in the preferred embodiment, takes the form of a cuff 20. The cuff is adapted to be wrapped around the limp of a patient and when it is inflated to a pressure above that of the systolic pressure of the particular patient, restricts the arterial blood flow through the limb.

Pressure is supplied to the cuff by any suitable means such as an air pump 21, shown schematically in FIGURE 2, which is capable of supplying air at a pressure above the maximum systolic pressure likely to be encountered. The air is supplied to the cuff by way of a conduit 22. A pressure regulator 23 is placed in the conduit 22 and the regulator is provided with an adjustable control knob 24 shown in the face of the instrument panel in FIGURE 1, in order to set the pressure at which the cuff will be inflated at the desired value. In use, the cuff pressure knob 24 is set to allow air to be supplied to the cuff at a predetermined value above the suspected systolic blood pressure, for instance, fifteen to twenty millimeters above systolic. Once the control knob 24 is set, it usually requires no further adjustment, except possibly when the pressure measurement of a different patient is taken.

A solenoid operated valve 25 is interposed in the conduit between the pressure regulator 23 and the cuff 20. Valve 25 is closed when its solenoid 26 is de-energized. Upon energization by means to be described subsequently, the valve opens and the cuff 20 is inflated.

The systolic indicator gauge 11 is connected to the conduit 22 by means of a branch conduit 27. A second solenoid operated valve 28 is placed in the branch conduit 27. Valve 28 is controlled by a solenoid 29. The valve is opened at the beginning of a pressure measurement cycle and remains open until its solenoid 29 is de-energized at the close of the cycle. Line 22 is also provided with a bleeder valve 30 downstream of the inflate solenoid. The bleeder valve 30 is adjustable by means of a control knob 31 shown in FIGURES 1 and 2, in order to control the rate of bleed-off of pressure from the cuff. A third valve 33, controllable by a solenoid 34, connects the cuff with atmosphere through a conduit 35. Valve 33 is open when the solenoid is de-energized and closes and remains closed throughout the blood pressure measurement cycle.

The operation of the apparatus so far described will now be briefly set forth. The cuff is wrapped around the limb and a transducer, described hereinafter, is placed against the limb downstream of the cuff. Upon initiation of a blood pressure reading cycle, solenoid 26 is energized to open controllable valve 25. Solenoid 29 is simultaneously energized and opens the valve 28. Valve 33 is closed at the same instant due to energization of its solenoid 34.

Cuff 20 is inflated by the air supply 21 and after a short time interval, the cuff restricts the flow of blood, and valve 25 closes after the predetermined inflating pressure is reached. The fluid under pressure is then slowly bled out of the cuff through bleeder valve 30. When the pressure drops to a point at which the first systolic pulse passes through the cuff, a transducer, to be described hereinafter, detects this pulse and operates a control circuit to re-open the valve 25. When the pressure in the cuff rises back up to the predetermined value determined by the setting of pressure regulator 23, valve 25 again closes and pressure bleeds off again through bleeder valve 30 until the next systolic pulse is detected by the transducer. Valve 25 again causes re-inflation of the cuff, then closes, and pressure bleed-off again takes place.

In the preferred form of the invention, when the third pulse is detected by the transducer, systolic solenoid 29 closes valve 28 and re-operation of the inflate valve 25 is prevented. Shortly after valve 28 closes, dump valbe 33 opens to completely deflate the cuff. The measuring cycle is completed and the last systolic pressure reading is locked on the gauge 11.

As shown diagrammatically in FIGURE 3, the instrument is provided with a transducer 38 for detecing the blood pressure pulses. While other types of transducers could be employed, I prefer a photoelectric pulse pick-up which can be placed against the finger of the patient with the cuff wrapped around the patient's arm. A particularly satisfactory type of pulse transducer is that disclosed in copending application No. 124,728, now Patent No. 3,167,658 of H. K. Richter, owned by the assignee of this application.

An amplifier 39 of conventional construction amplifies each pulse picked up by the transducer 38. The pulse is then fed to a single-shot multivibrator 40 and the pulse output of the multivibrator is fed to a conventional integrator device 41, the switch 18 and the ammeter 14, which provides an indication of the pulse rate of the patient when the switch 18 is in the position shown in FIGURE 3. Suitable lamp 42 and speaker 43 may also be provided to give a visible and audible indication of the pulse rate. In addition, conventional recording equipment 44 may be connected to the output of the amplifier in order to record the pulse, and for this purpose, a suitable socket, not shown, adapted to receive a recorder jack, may be provided on the side of the instrument casing.

In order to display a reading of the patient's temperature, a temperature pick-up, for example, a thermistor shown in block diagram form at 45 is connectible to the meter 14, through a suitable circuit 46 and the switch 18. According to the preferred form of the equipment, circuit 46 takes the form of the bridge circuit shown in FIGURE 3a, the thermistor being connected in one arm of the bridge circuit so that variations in temperature of the patient produce a reading on the meter 14 when switch 18 is closed.

For the purpose of measuring the blood pressure of the patient, the pulse which occurs at the patient's systolic pressure is sensed by the transducer 38 as the cuff pressure bleeds off. In response to this pulse an electrical impulse is fed to the amplifier, and after amplification causes multivibrator 40 to fire. The output impulse is fed through line 50 and to "and" gate 51. In a manner to be described herebelow, a "flip-flop" 52 is set at the beginning of the blood pressure cycle, to energize line 53. So long as a signal appears on line 53, each impulse transmitted to the "and" gate through line 50 will cause the gate to conduct and thereby energize the inflate solenoid 26 to open the inflate valve 25. The signal is of sufficient duration to hold the valve open long enough after energization for the cuff to inflate to the desired level.

Each pulse delivered to the "and" gate, also produces a pulse which is amplified by an amplifier 54. This amplified pulse is fed into a pulse counter or storage device 55. Pulse counter 55 is of conventional construction and is designed to produce an output pulse after it has received a predetermined number of input pulses. Each pulse fed to the counter 55 is simultaneously fed through line 55a to the upper input of "and" gate 56 as viewed in FIGURE 3. Upon receipt of a predetermined number of pulses in the counter, three in the preferred embodiment, the counter produces an output pulse which is fed to the other side of the gate 56. The presence of pulses on both sides of the gate 56 causes the gate to conduct, applying a signal to the "flip-flop" 52. The "flip-flop" is thus actuated to de-energize the line 53. De-energization of line 53 blocks operation of gate 51 since the upper input of the gate is no longer energized. Thus the inflate solenoid cannot be operated by succeeding pulses fed to the other input of the gate until line 53 is again energized at the beginning of the next measurement cycle. At the same time, systolic solenoid 29 is de-energized to close the systolic valve 28, locking the reading on the systolic pressure gauge. Switching of the "flip-flop" 52 also de-energizes cycle indicator 58 and the absence of a signal indicates to the attendant that the measuring cycle is at an end. After a short delay, caused by suitable time delay means 34a, for instance of the R-C type, dump solenoid 34 is de-energized allowing the dump valve 33 to open so that the cuff is deflated. The delay insures that the rapid exhaust through the dump valve does not take place until after the pressure reading is locked on the systolic pressure gauge.

To operate the instrument, main selector switch 19, as viewed in FIGURE 1, is movable from the "Off" position to positions in which a blood pressure measurement will be taken every five minutes, every ten minutes or, when moved to the manual position, the reading may be taken whenever the operator desires. When in the manual position, the instrument will give a reading of either pulse or temperature and when a pressure measurement reading is desired, switch 19 is moved to the inflate position. The switch 19 is preferably spring-loaded to return it from the inflate to the manual position when released by the operator after the cuff is inflated.

In FIGURE 4, the switch 19 is represented by interconnected L-shaped contactor plates 19a and 19b respectively. Movement of the switch 19 away from the "Off" position (shown in FIGURE 4) moves the L shaped sections upwardly. Movement of contactor plate 19a also closes a main line switch 60, whenever the selector switch is moved from the "Off" position thereby energizing the power supply of the instrument. When switch 19 is moved to the five minute cycle position, shown in FIGURE 1, a circuit is completed from the power supply 61, through line 62, through the contact plate 19b, and line 63 to a timer motor 69. The motor circuit is completed by a line 70 returning to the power supply 61. Energization of the power supply also causes a pump relay 64 to operate, thereby starting up pump 21.

Timer motor 69 is provided with a drive shaft 72 upon which cams 73 and 74 are fixed for rotation. A pair of cam controlled switches 75 and 76 are provided with followers 77 and 78 which ride on the surfaces of cams 73 and 74 respectively. The motor rotates the cams at a speed of one revolution every ten minutes and the cams are shaped so that switches 75 and 76 are alternately closed for a short interval, for instance about 7 seconds, at five minute intervals.

When the selector switch 19 is in the five minute position, a circuit is completed from the power supply through the plates 19a and 19b through the lines 79 and 80 to the switches 75 and 76 respectively. During one revolution of motor shaft 72, switches 75 and 76 will be closed at five minute intervals to cause a pulse of energy to be delivered through line 81 or 82 to line 83 to the inflate solenoid 25 and to reset line 84. The pulse of energy on reset line 84 resets the "flip-flop" 52 causing it to energize line 53 and to light the cycle indicator 58. It also energizes the dump solenoid 34, to close dump valve 33 and energizes systolic solenoid 29 to open systolic valve 28. A measurement cycle will take place and the final systolic reading will be locked on systolic monometer gauge 11. Five minutes later, the other one of switches 5, 76 will close to cause another measurement cycle to be initiated.

When the switch is moved to the ten minute position shown on the insrument dial in FIGURE 1, the base of plate 19a will be moved upwardly out of contact with the contact member for line 80. The base of plate member 19b is formed so that when the switch is in the ten minute position, its base is still in contact with the contact member for line 79 and thus a circuit is completed through the switch 75, to the reset line 84 and to inflate solenoid 25 once every ten minutes.

When the selector switch is in the manual position, the base of neither plate member 19a nor plate member 19b is in engagement with a contact member. But when the selector switch is rotated to the inflate position, the base of member 19b completes a circuit to the inflate solenoid 25 and the reset line 84 through the contact associated with line 85. When the selector switch is released, the spring returns it to the manual position and the inflate solenoid is de-energized.

With the foregoing monitoring apparatus, accurate and repeated measurements of vital parameters such as blood pressure, pulse and temperature are possible with relatively little supervision on the part of hospital personnel.

Since three successive blood pressure readings are taken during each measurement cycle, an attendant can immediately detect the fact when an erroneous reading is taken.

Automatic measurement with apparatus formed according to the invention frees physicians, surgeons and nurses to devote more of their skills to direct care of the patient.

We claim:

1. Blood pressure measuring apparatus comprising pressure operated means adapted to restrict the flow of blood through an artery upon admission to said means of fluid under pressure above a predetermined value; means for supplying operating fluid at pressure above said predetermined value; pressure indicating means; controllable valve means for connecting said supply means to said indicating means and said pressure operated means; means for operating said valve means to connect said supply means to said pressure operated means and to said indicating means and thereby raise the pressure in the pressure operated means above said predetermined value and for thereafter disconnecting said supply means; means for bleeding off pressure from the pressure operated means to a value below said predetermined value; a transducer adapted to respond to blood pressure pulses at a point on the artery more remote from the heart than the pressure operated means; control circuit means responsive to the pick-up of each of a plurality of pulses by said transducer to operate said valve means to reconnect said supply means and thereby re-establish a pressure above said predetermined value; said control circuit means further including means for counting said pulses; and means controlled by said counting means to provide against reconnection of the supply means when a predetermined number of pulses have been received by the counting means.

2. Apparatus according to claim 1, wherein said controllable valve means includes two valves located respectively between the supply means and the indicating means and between the indicating means and the pressure operated means; means to hold said second valve in the open position independently of the first valve; and circuitry interconnecting the counter and the second valve to close said second valve to isolate the indicator means from the pressure operated means when the counter has received said predetermined number of pulses.

3. Blood pressure measuring apparatus comprising a pressure operated device adapted to restrict the flow of blood through an artery upon admission to said device of fluid above a predetermined pressure value; means for supplying operating fluid at a pressure above said predetermined value; pressure indicating means; controllable valve means for connecting said supply means to said indicating means and said pressure operated means; means for operating said valve means to vary the pressure in the pressure operated means through a range including the systolic pressure in said artery; a transducer adapted to respond to blood pressure pulses at a point on the artery more remote from the heart than the pressure operated means; control circuit means responsive to the pick-up of the systolic pulse by said transducer means to re-operate said valve operating means; and pulses storage means operable in response to a predetermined number of systolic pulses to block further operation of said controllable valve means.

4. Blood pressure measuring apparatus comprising pressure operated means adapted to restrict the flow of blood through an artery upon admission to said means of fluid under pressure above a predetermined value; means for supplying operating fluid at a pressure above said predetermined value; pressure indicating means; controllable valve means for connecting said supply means to said indicating means and said pressure operated means; means for operating said valve means to connect said supply means to said pressure operated means and to said indicating means and thereby raise the pressure in the pressure operated means above said predetermined value and for thereafter disconnecting said supply means; means for bleeding off pressure from the pressure operated means to a value below said predetermined value; a transducer adapted to respond to blood pressure pulses at a point on the artery more remote from the heart than the pressure operated means; and a control circuit responsive to the pick-up of a pulse by said transducer to operate said valve means to re-connect said supply means and thereby re-establish a pressure above said predetermined value; a counter in said control circuit for counting the pulses picked up by said transducer; and means interconnecting said counter and said valve operating means to provide against re-connection of the supply means upon receipt of said counter of a third pulse.

5. Blood pressure measuring apparatus comprising pressure operated means adapted to restrict the flow of blood through an artery upon admission to said means of fluid under pressure above a predetermined value; means for supplying operating fluid at a pressure above said predetermined value; pressure indicating means; a first controllable valve between said supply and said indicating means; a second controllable valve between said indicating means and said pressure operated means; means for opening said first and second valves to connect said supply means to said indicating means and to said pressure operated means and thereby raise the pressure in the pressure operated means above said predetermined value and for thereafter closing said first valve to disconnect said supply means; means for bleeding off the pressure in said pressure operated means; a transducer adapted to respond to blood pressure pulses at a point on the artery more remote from the heart than the pressure operated means; circuit means connected to said transducer means and to said valve operating means, said circuit means being responsive to the pick-up of each of a predetermined number of pulses by said transducer means to reopen said first valve, said circuit means including a pulse storage device operative upon storage of a predetermined number of pulses to retain said first valve closed and to close said second valve.

6. Apparatus according to claim 5, further including a branch conduit connecting said indicating means to said pressure operated means at a point downstream of said first valve and wherein said second valve is located in said conduit.

7. Apparatus according to claim 5, further including third controllable valves connecting said pressure operated means to atmosphere and means controlled by said pulse storage means to open said third controllable valves subsequent to closure of said second valve.

8. Vital signs monitoring equipment comprising: a transducer adapted to respond to blood pressure pulses in an artery; an integrator connected to said transducer, said integrator including a meter for indicating the number of pulses picked up by the transducer; a pressure operated device adapted to restrict the flow of blood through said artery upstream of the transducer upon admission to said device of fluid under pressure above a predetermined value; means for supplying operating fluid at a pressure above said predetermined value; pressure indicating means; controllable valve means for connecting said supply means with said pressure indicating means and with said pressure operated means; means for operating said valve means to connect said supply means to said pressure operated means and to said indicating means and thereby raise the pressure in the pressure operated means above said predetermined value and for thereafter disconnecting said supply means; means for bleeding off pressure from the pressure operated device; control circuit means interconnecting said transducer and valve operating means, and operable in response to the pick-up of a pulse by said transducer to re-connect said supply means and thereby re-establish a pressure above said predetermined value; means in said control circuit for counting the pulses picked up by said transducer; gate means interconnecting said counter and said valve operating means to provide against reconnection of said source upon receipt by said counter of a third pulse; and timer means connected to said gate and to said valve operating means and operable periodically to re-open said valve means and to reset said gate, thereby initiating a blood pressure measuring cycle, said meter providing a measurement of pulse rate between blood pressure measuring cycles.

References Cited

UNITED STATES PATENTS

| | | | |
|---|---|---|---|
| 2,118,329 | 5/1938 | Snyder | 128—2.05 |
| 2,379,573 | 7/1945 | Gilson | 128—2.05 |
| 2,447,018 | 8/1948 | Keinath | 128—2.05 |
| 2,875,750 | 3/1959 | Boucke et al. | 128—2.05 |
| 3,143,111 | 8/1964 | Green | 128—213 |

WILLIAM E. KAMM, *Primary Examiner.*